(12) United States Patent
Rosenberg et al.

(10) Patent No.: US 8,260,271 B2
(45) Date of Patent: *Sep. 4, 2012

(54) SYSTEMS AND METHODS FOR FACILITATING THE ACQUISITION OF CONTENT

(75) Inventors: Jeremy C. Rosenberg, Havre de Grace, MD (US); Robert A. Ellis, Wyndmoor, PA (US); Ronald M. Yurman, Short Hills, NJ (US); Siamak Behta, Conshohocken, PA (US)

(73) Assignee: Music Choice, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/189,963

(22) Filed: Jul. 25, 2011

(65) Prior Publication Data

US 2011/0281565 A1    Nov. 17, 2011

Related U.S. Application Data

(63) Continuation of application No. 12/702,472, filed on Feb. 9, 2010, now Pat. No. 7,986,977, which is a continuation of application No. 11/452,994, filed on Jun. 15, 2006, now Pat. No. 7,668,538.

(60) Provisional application No. 60/690,512, filed on Jun. 15, 2005.

(51) Int. Cl.
*H04M 3/42* (2006.01)

(52) U.S. Cl. .................... 455/414.1; 455/3.06; 455/418; 455/567

(58) Field of Classification Search ............... 455/414.1, 455/567, 3.06, 418, 412.1
See application file for complete search history.

(56) References Cited

U.S. PATENT DOCUMENTS

| | | |
|---|---|---|
| 4,127,796 A | 11/1978 | Henderson |
| RE29,997 E | 5/1979 | Den Toonder |
| 4,336,478 A | 6/1982 | Quilty et al. |
| 4,338,623 A | 7/1982 | Asmus et al. |
| 4,360,805 A | 11/1982 | Andrews et al. |
| 4,677,430 A | 6/1987 | Falkman et al. |
| 4,722,005 A | 1/1988 | Ledenbach |
| 4,760,455 A | 7/1988 | Nagashima |
| 4,799,156 A | 1/1989 | Shavit et al. |
| 4,823,386 A | 4/1989 | Dumbauld |
| 5,130,615 A | 7/1992 | George |
| 5,193,006 A | 3/1993 | Yamazaki |
| 5,235,680 A | 8/1993 | Bijnagte |
| 5,315,448 A | 5/1994 | Ryan |
| 5,341,350 A | 8/1994 | Frank et al. |
| 5,355,302 A | 10/1994 | Martin et al. |
| 5,365,381 A | 11/1994 | Scheffler |
| 5,371,551 A | 12/1994 | Logan et al. |
| 5,418,654 A | 5/1995 | Scheffler |
| 5,420,838 A | 5/1995 | Maeda et al. |

(Continued)

OTHER PUBLICATIONS

Adolphe V. Bemotas, "Computers and TV: Marriage of the Future:[Five Star Lift Edition]", St. Louis Post—Dispatch, Oct. 11, 1995, 1 page.

(Continued)

*Primary Examiner* — Sharad Rampuria
(74) *Attorney, Agent, or Firm* — Rothwell, Figg, Ernst & Manbeck, P.C.

(57) ABSTRACT

The present invention provides systems and methods for acquiring content (e.g., a ring tone or a ring view) for a communication device.

33 Claims, 10 Drawing Sheets

U.S. PATENT DOCUMENTS

| | | | |
|---|---|---|---|
| 5,481,296 A | 1/1996 | Cragun et al. | |
| 5,534,911 A | 7/1996 | Levitan | |
| 5,550,863 A | 8/1996 | Yurt et al. | |
| 5,557,541 A | 9/1996 | Schulhof et al. | |
| 5,572,442 A | 11/1996 | Schulhof et al. | |
| 5,585,866 A | 12/1996 | Miller et al. | |
| 5,590,282 A | 12/1996 | Clynes | |
| 5,592,511 A | 1/1997 | Schoen et al. | |
| 5,616,876 A | 4/1997 | Cluts | |
| 5,617,565 A | 4/1997 | Augenbraun et al. | |
| 5,629,867 A | 5/1997 | Goldman | |
| 5,635,989 A | 6/1997 | Rothmuller | |
| 5,636,276 A | 6/1997 | Brugger | |
| 5,646,992 A | 7/1997 | Subler | |
| 5,675,734 A | 10/1997 | Hair | |
| 5,708,780 A | 1/1998 | Levergood et al. | |
| 5,721,815 A | 2/1998 | Ottesen et al. | |
| 5,726,909 A | 3/1998 | Krikorian | |
| 5,734,719 A | 3/1998 | Tsevdos et al. | |
| 5,734,961 A | 3/1998 | Castille | |
| 5,751,282 A | 5/1998 | Girard et al. | |
| 5,751,806 A | 5/1998 | Ryan | |
| 5,753,844 A | 5/1998 | Matsumoto | |
| 5,754,939 A | 5/1998 | Herz et al. | |
| 5,761,606 A | 6/1998 | Wolzien | |
| 5,761,607 A | 6/1998 | Gudesen | |
| 5,761,662 A | 6/1998 | Dasan | |
| 5,771,435 A | 6/1998 | Brown | |
| 5,781,889 A | 7/1998 | Martin et al. | |
| 5,784,095 A | 7/1998 | Robbins et al. | |
| 5,790,935 A | 8/1998 | Payton | |
| 5,793,980 A | 8/1998 | Glaser et al. | |
| 5,809,144 A | 9/1998 | Sirbu et al. | |
| 5,809,246 A | 9/1998 | Goldman | |
| 5,818,935 A | 10/1998 | Maa | |
| 5,819,049 A | 10/1998 | Reietmann | |
| 5,819,160 A | 10/1998 | Foladare et al. | |
| 5,835,487 A | 11/1998 | Campanella | |
| 5,841,979 A | 11/1998 | Schulhof et al. | |
| 5,848,398 A | 12/1998 | Martin et al. | |
| 5,861,906 A | 1/1999 | Dunn et al. | |
| 5,878,141 A | 3/1999 | Daly et al. | |
| 5,890,137 A | 3/1999 | Koreeda | |
| 5,890,139 A | 3/1999 | Suzuki et al. | |
| 5,899,699 A | 5/1999 | Kamiya | |
| 5,899,980 A | 5/1999 | Wilf et al. | |
| 5,900,830 A | 5/1999 | Scheffler | |
| 5,913,204 A | 6/1999 | Kelly | |
| 5,918,012 A | 6/1999 | Astiz et al. | |
| 5,918,213 A | 6/1999 | Bernard et al. | |
| 5,926,624 A | 7/1999 | Katz et al. | |
| 5,930,765 A | 7/1999 | Martin et al. | |
| 5,930,768 A | 7/1999 | Hooban | |
| 5,931,901 A | 8/1999 | Wolfe et al. | |
| 5,933,500 A | 8/1999 | Blatter et al. | |
| 5,943,422 A | 8/1999 | Van Wie et al. | |
| 5,944,608 A | 8/1999 | Reed et al. | |
| 5,959,945 A | 9/1999 | Kleiman | |
| 5,960,411 A | 9/1999 | Hartman et al. | |
| 5,968,120 A | 10/1999 | Guedalia | |
| 5,969,283 A | 10/1999 | Looney et al. | |
| 5,970,474 A | 10/1999 | LeRoy et al. | |
| 5,973,722 A | 10/1999 | Wakai et al. | |
| 5,980,261 A | 11/1999 | Mino et al. | |
| 5,986,692 A | 11/1999 | Logan et al. | |
| 5,991,374 A | 11/1999 | Hazenfield | |
| 5,991,737 A | 11/1999 | Chen | |
| 6,011,761 A | 1/2000 | Inoue | |
| 6,011,854 A | 1/2000 | Van Ryzin | |
| 6,020,883 A | 2/2000 | Herz et al. | |
| 6,021,432 A | 2/2000 | Sizer et al. | |
| 6,025,868 A | 2/2000 | Russo | |
| 6,038,591 A | 3/2000 | Wolfe et al. | |
| 6,055,314 A | 4/2000 | Spies et al. | |
| 6,055,566 A | 4/2000 | Kikinis | |
| 6,085,235 A | 7/2000 | Clarke et al. | |
| 6,088,455 A | 7/2000 | Logan et al. | |
| 6,088,722 A | 7/2000 | Herz et al. | |
| 6,105,060 A | 8/2000 | Rothblatt | |
| 6,135,646 A | 10/2000 | Kahn et al. | |
| 6,141,488 A | 10/2000 | Knudson et al. | |
| 6,151,634 A | 11/2000 | Glaser et al. | |
| 6,154,772 A | 11/2000 | Dunn et al. | |
| 6,161,142 A | 12/2000 | Wolfe et al. | |
| 6,192,340 B1 | 2/2001 | Abecassis | |
| 6,223,292 B1 | 4/2001 | Dean et al. | |
| 6,226,030 B1 | 5/2001 | Harvey et al. | |
| 6,226,618 B1 | 5/2001 | Downs et al. | |
| 6,229,895 B1 | 5/2001 | Son et al. | |
| 6,232,539 B1 | 5/2001 | Looney et al. | |
| 6,233,389 B1 | 5/2001 | Barton et al. | |
| 6,233,682 B1 | 5/2001 | Fritsch | |
| 6,240,553 B1 | 5/2001 | Son et al. | |
| 6,243,725 B1 | 6/2001 | Hempleman et al. | |
| 6,246,672 B1 | 6/2001 | Lumelsky | |
| 6,248,946 B1 | 6/2001 | Dwek | |
| 6,249,810 B1 | 6/2001 | Kiraly | |
| 6,253,235 B1 | 6/2001 | Estes | |
| 6,253,237 B1 | 6/2001 | Story et al. | |
| 6,262,772 B1 | 7/2001 | Shen et al. | |
| 6,263,505 B1 | 7/2001 | Walker et al. | |
| 6,279,040 B1 | 8/2001 | Ma et al. | |
| 6,286,139 B1 | 9/2001 | Decingue | |
| 6,305,020 B1 | 10/2001 | Horaty et al. | |
| 6,324,217 B1 | 11/2001 | Gordon | |
| 6,330,595 B1 | 12/2001 | Ullman et al. | |
| 6,330,609 B1 | 12/2001 | Garofalakis et al. | |
| 6,338,044 B1 | 1/2002 | Cook et al. | |
| 6,366,791 B1 | 4/2002 | Lin et al. | 455/567 |
| 6,369,851 B1 | 4/2002 | Marflak et al. | |
| 6,389,467 B1 | 5/2002 | Eyal | |
| 6,393,430 B1 | 5/2002 | Van Ryzin | |
| 6,418,421 B1 | 7/2002 | Hurtado et al. | |
| 6,434,747 B1 | 8/2002 | Khoo et al. | |
| 6,445,306 B1 | 9/2002 | Trovato | |
| 6,446,080 B1 | 9/2002 | Van Ryzin et al. | |
| 6,446,130 B1 | 9/2002 | Grapes | |
| 6,490,728 B1 | 12/2002 | Kitazato et al. | |
| 6,505,240 B1 | 1/2003 | Blumenau | |
| 6,507,727 B1 | 1/2003 | Henrick | |
| 6,526,411 B1 | 2/2003 | Ward | |
| 6,550,011 B1 | 4/2003 | Sims, III | |
| 6,587,127 B1 | 7/2003 | Leeke et al. | |
| 6,587,837 B1 | 7/2003 | Spagna et al. | |
| 6,597,891 B2 | 7/2003 | Tantawy et al. | 455/3.05 |
| 6,748,427 B2 | 6/2004 | Drosset et al. | |
| 6,766,357 B1 | 7/2004 | Fandozzi | |
| 6,782,550 B1 | 8/2004 | Cao | |
| 6,785,707 B2 * | 8/2004 | Teeple | 709/203 |
| 6,789,106 B2 | 9/2004 | Eyer | |
| 6,792,280 B1 | 9/2004 | Hori et al. | |
| 6,795,711 B1 | 9/2004 | Sivula | 455/466 |
| 6,842,604 B1 | 1/2005 | Cooke | |
| 6,856,550 B2 | 2/2005 | Kato et al. | |
| 6,865,550 B1 | 3/2005 | Cok | |
| 6,898,800 B2 | 5/2005 | Son et al. | |
| 6,925,489 B1 | 8/2005 | Curtin | |
| 6,933,433 B1 | 8/2005 | Porteus et al. | |
| 6,965,770 B2 | 11/2005 | Walsh et al. | 455/426.1 |
| 6,985,694 B1 | 1/2006 | De Bonet et al. | |
| 7,020,888 B2 | 3/2006 | Reynolds et al. | |
| 7,024,678 B2 | 4/2006 | Gordon et al. | |
| 7,028,082 B1 | 4/2006 | Rosenberg et al. | |
| 7,062,272 B2 | 6/2006 | Grilli et al. | 455/435.1 |
| 7,065,287 B1 | 6/2006 | Heredia et al. | |
| 7,076,561 B1 | 7/2006 | Rosenberg et al. | |
| 7,111,099 B2 | 9/2006 | Alexander et al. | |
| 7,133,924 B1 | 11/2006 | Rosenberg et al. | |
| 7,149,471 B1 | 12/2006 | Arisawa et al. | |
| 7,181,538 B2 | 2/2007 | Tam et al. | 709/246 |
| 7,302,253 B2 | 11/2007 | Moody et al. | 455/412.2 |
| 7,321,923 B1 | 1/2008 | Rosenberg et al. | |
| 7,325,043 B1 | 1/2008 | Rosenberg et al. | |
| 7,343,179 B1 | 3/2008 | Theis et al. | 455/567 |
| 7,668,538 B2 * | 2/2010 | Rosenberg et al. | 455/414.1 |
| 7,869,580 B2 * | 1/2011 | Tagawa et al. | 379/88.22 |
| 7,986,977 B2 * | 7/2011 | Rosenberg et al. | 455/567 |

| | | | |
|---|---|---|---|
| 8,060,055 B2 * | 11/2011 | Huang | 455/401 |
| 2001/0032312 A1 | 10/2001 | Runje et al. | |
| 2001/0042107 A1 | 11/2001 | Palm | |
| 2001/0049826 A1 | 12/2001 | Wilf | |
| 2002/0021708 A1 | 2/2002 | Ishiai | |
| 2002/0023163 A1 | 2/2002 | Frelechoux et al. | |
| 2002/0023164 A1 | 2/2002 | Lahr | |
| 2002/0023166 A1 | 2/2002 | Bar-Noy et al. | |
| 2002/0032728 A1 | 3/2002 | Sako et al. | |
| 2002/0038359 A1 | 3/2002 | Ihara et al. | |
| 2002/0046084 A1 | 4/2002 | Steele et al. | |
| 2002/0056117 A1 | 5/2002 | Hasegawa et al. | |
| 2002/0056118 A1 | 5/2002 | Hunter et al. | |
| 2002/0058521 A1 | 5/2002 | Yamada et al. | 455/458 |
| 2002/0059621 A1 | 5/2002 | Thomas et al. | |
| 2002/0062261 A1 | 5/2002 | Mukai | |
| 2002/0083148 A1 | 6/2002 | Shaw et al. | |
| 2002/0138630 A1 | 9/2002 | Solomon et al. | |
| 2002/0152278 A1 | 10/2002 | Pontenzone et al. | |
| 2002/0194260 A1 | 12/2002 | Headley et al. | |
| 2002/0194619 A1 | 12/2002 | Chang et al. | |
| 2003/0023975 A1 | 1/2003 | Schrader et al. | |
| 2003/0050058 A1 | 3/2003 | Walsh et al. | 455/426 |
| 2003/0050837 A1 | 3/2003 | Kim | 705/14 |
| 2003/0097338 A1 | 5/2003 | Mankovich et al. | |
| 2003/0120500 A1 | 6/2003 | Deeds et al. | 705/1 |
| 2003/0126595 A1 | 7/2003 | Sie | |
| 2003/0135464 A1 | 7/2003 | Mourad et al. | |
| 2003/0153302 A1 | 8/2003 | Lewis et al. | 455/412 |
| 2003/0162571 A1 | 8/2003 | Chung | 455/567 |
| 2003/0182184 A1 | 9/2003 | Strasnick et al. | |
| 2006/0173974 A1 | 8/2006 | Tang | |
| 2006/0194626 A1 | 8/2006 | Anttila | 455/701 |
| 2006/0199575 A1 | 9/2006 | Moore et al. | 455/418 |
| 2007/0168429 A1 | 7/2007 | Apfel et al. | 709/206 |

OTHER PUBLICATIONS

John Sweeney, "An Introduction to Interactive Television", International Broadcasting Convention, 1994, pp. 503-508.
6 Pages from the web site for www.request.com.
Clark D., "ClickRadio to Start Digital Music Services" WSJ Interactive Edition 2000, 2 pages.
"ClickRadio granted first interactive radio license by universal music group; . . . " www.prnewswire.com printed Apr. 20, 2000, 2 pages.
Gordon C., "ClickRadio sidesteps competition with music licensing deals" Atnewyork.com. May 9, 2000, 3 pages.
"Phillips showcases clickradio on digital set-top at western show 2000; . . . " Business Wire Inc. Nov. 29, 2000, 2 pages.
Web site for www.sonicnet.com. printed Jun. 22, 2004, 6 pages.
ntl: Digital Radio. http://www.ntl.com/locales/gb/en/guides/dummies/produce.asp 2 pages.
Bower, A.J., "Digital Radio—A Revolution for In-Car Entertainment" Proc. NavPos Automative '98 Conf., vol. 2, Session 5-8, Jun. 10, 1998, pp. 40-51 (10 pages).
Deutsche Telekom AG: Digital Radio http://www.telekom.de/dtag/ipl1/cda/level3_a/036801007700.html 1 page.
The Eureka 147 Consortium "Digital Audio Broadcasting" http://www.eurekadab.org/eureka_147_consortium.htm 3 pages.
Radio Authority Digital Radio Fact Sheet No. 4, 1999, http://www.radioauthority.org.uk/Information/Fact_Sheets/fs4.htm 5 pages.
"The ICTV Digital Broadband System", ICTV Inc. White Paper Nov. 2000, 11 pages.
http://launch.yahoo.com "Music on Yahoo", 2 pages.
"Sonicbox brings Net radio into your living room" (Partyka, Jeff, Oct. 12, 1999, CNN.com) 3 pages.
"Internet Radio Listeners Unchained From Their PCs" (Olenick, Doug, Oct. 25, 1999, Twice Computer Technology), 1 page.
"Sonicbox and Microsoft Bring Windows Media Internet Radio to the Home Stereo", (Dec. 7, 1999, Microsoft Press Release), 3 pages.
King, Brad, "Tune on Tune in Drop Cash" Dec. 8, 2000 , Wired News 2 pages.
"Global Media Announces Launch of Independent Internet Radio Station", News Release Feb. 1, 1999, 2 pages.
"Platinum Entertainment and Liquid Audio Join Forces to Offer Extensive Music Catalog via Digital Downloads", Press Relaese Jul. 15, 1998, 2 pages.
LaFrance, Siona, "Thinking Globally with a web-based radio station vying for listeners around the world homegrown internet company fastband aims to shake up the music world" Times Picayune Nov. 4, 1999, 2 pages.
"Tune into Yahoo! Radio" Yahoo Media Relations Press Release Yahoo! Teams up with Broadcast.com and Spinner.com to Provide 10 stations of Audio Programming May 11, 1999, 2 pages.
Yahoo Offers one-stop shop for e-music, Milwaulkee Journal Sentinel (Wisconsin) Aug. 25, 1999, 1 page.
uniView Technologies Now in Yahoo!'s Multicast Affiliate Program, Press Release Newswire Association Inc., Oct. 19, 1999, 2 pages.
"WebRadio.com Signs on as Liquid Music Network Affiliate Offering Liquid Audio Digital Downloads", Business Wire, Inc., Sep. 1, 1999, 2 pages.
"Blue Note Radio: Now Playing on a Computer Screen Near You; EMI's Blue Note Records Expands New Media Initiative with RadioWave.com" Press Release Newswire Association Inc, Apr. 4, 2000, 2 pages.
"Set-top box for television that reads your mind", Financial Times Limited, London, England, Dec. 30, 1998 1 page.
Rajapakshe, H., et al. "Video On Demand", Jun. 1995, pp. 1-15 (http://www.doc.ic.ac.uk/~nd/surprise_95/journal/vol4/shr/report.html).
Welz, Gary, "Integrated Streaming Technologies", Multimedia Web, Oct. 30, 1996, pp. 1-3.
Loeb S., "Architecting Personalized Delivery of Multimedia Information", Communications of the ACM, Dec. 1992, vol. 35, No. 12, pp. 39-48 (10 pages).
International Search Report and Written Opinion issued in PCT/US06/23580 on Mar. 16, 2007, 11 pp.

* cited by examiner

SYSTEMS AND METHODS FOR FACILITATING THE ACQUISITION OF CONTENT

This application is a continuation of application Ser. No. 12/702,472 filed Feb. 9, 2010 (scheduled to issue as U.S. Pat. No. 7,986,977 on Jul. 26, 2011) which is a continuation of Ser. No. 11/452,994, filed on Jun. 15, 2006, now U.S. Pat. No. 7,668,538, which claims the benefit of Provisional Patent Application No. 60/690,512, filed on Jun. 15, 2005. The above mentioned references are incorporated by reference herein.

BACKGROUND OF THE INVENTION

1. Field of the Invention

The invention relates generally to systems and methods for acquiring content (e.g., music videos, digital music, ring tones, ring views, and other time-based media).

2. Discussion of the Background

Typically, a user who desires to acquire content, such as a digital audio file containing a song or other content, uses a communication device (e.g., a personal computer, mobile phone or other communication device) to connect to a server that stores the content, searches or browses for the desired content and, after locating the desired content, downloads the content to the communication device from the server.

What is desired are systems and methods to make it easier for a user to acquire content.

SUMMARY OF THE INVENTION

Embodiments of the present invention provide systems and methods that facilitate the acquisition of content.

In one aspect, the present invention provides systems and methods for acquiring ring content (e.g., ring tones or ring views) for a mobile phone. The types of ring content that may be acquired include, but are not limited to: (1) monophonic ring tones; (2) polyphonic ring tones; (3) "true" ring tones or "master" ring tones (containing original audio recording(s)); and (4) ring views (a ring view is a video (or portion of a video) played by a telephone to indicate an incoming call or message, in contrast, a ring tone is a sound made by the telephone to indicate an incoming call or message).

A method for acquiring ring content for a mobile phone according to one embodiment of the invention includes: (1) transmitting to the mobile phone (a) an audio track (e.g., a song) or video content (e.g. a music video or movie clip) (the audio track or video content may be streamed to the mobile phone) so that the mobile phone can play the audio or video (i.e., content) for the user and (b) an identifier identifying the audio or video content and a remote system (e.g., the identifier may be a link or a uniform resource identifier or locator); (2) enabling the user of the mobile phone to indicate that the user desires to acquire ring content corresponding to the content while the mobile phone is playing the content (e.g., the user may indicate that the user desires to acquire the ring content by activating a pre-selected button on the mobile phone or selecting a menu option displayed on a user interface of the mobile phone or activating a soft button, etc.); (3) in response to the user indicating his/her desire to acquire the ring content, transmitting, from the mobile phone to the identified remote system, a message containing an identifier identifying the content (the message may also contain an identifier identifying the mobile phone, the ring content capabilities of the mobile phone, and/or an identifier identifying a type of ring content (e.g., monophonic, polyphonic, master or video)); (4) receiving, at the remote system, the message; (5) selecting a ring tone or view based on the message (e.g., if the message includes information indicating that the user desires a ring tone and indicating that the mobile phone can play master ring tones, then the server may select a music ring tone corresponding to the song or music video identified in the message; similarly, if the message includes information indicating that the user wants a ring tone and that the mobile phone can not play master ring tones, but can play polyphonic ring tones, then the server may select a polyphonic ring tone corresponding to the song or music video identified in the message; likewise, for example, if the message includes information indicating that the user desires to have a polyphonic ring tone, then the server may select a polyphonic ring tone corresponding to the song or music video identified in the message, regardless of whether the mobile phone is capable of playing master ring tones); (6) transmitting, from the remote system to the mobile phone, the selected ring content; (7) receiving the ring content at the mobile phone; and (8) storing the ring content in a storage unit of the mobile phone.

As would be understood by one of ordinary skill in the art, the above described method enables direct linking from streamed content (songs, videos, etc) to an associated ring tone or ring view for buying. This will enable the consumer to skip many steps and go directly to the appropriate menu for buying the linked ring tone or view.

A method for acquiring ring content for a mobile phone according to a second embodiment of the invention includes: (1) transmitting to the mobile phone an audio track (e.g. a song) or a piece of video content (e.g. a music video) (the audio or video content may be streamed to the mobile phone) so that the mobile phone can play the audio or video (i.e., content) for the user; (2) receiving the content at the mobile phone; (3) playing the content for the user; (4) storing a predetermined portion of the content in a storage unit of the mobile phone (e.g., the predetermined portion may include the first 30 or more seconds of the content); (5) optionally protecting the stored content using a digital rights management (DRM) scheme; (6) enabling the user of the mobile phone to indicate that the user desires to acquire ring content corresponding to the content while the mobile phone is playing the content; (7) after the user indicates his/her desire to acquire the ring content, optionally transmitting a message to a remote system, wherein the message identifies the content the mobile phone and/or the user; (8) receiving, at the mobile phone and from the remote system, a response to the message, wherein the response may indicate whether the user is authorized to acquire the ring content; (9) if the response indicates that the user may not acquire the ring content, then deleting the stored portion of the content from the storage unit, otherwise the stored portion of the content may be converted to an appropriate format (e.g., monophonic or polyphonic ring tone, or MP3 format audio, MP4 format video or other format), moved to a ring content storage area and/or, if the content is digital rights management (DRM) protected, the DRM protection is removed or a license is obtained; and (10) if the user does not indicate that he/she desired to acquire ring content corresponding to the received content while the received content is playing or within a set time after the received content finishes playing or if the user is offered to purchase the ring content but declines the offer, then deleting the stored portion of the content from the storage unit.

A method for acquiring ring content for a mobile phone according to a third embodiment of the invention includes: (1) transmitting to the mobile phone an audio track (e.g. a song) or a video clip (e.g. a music video) (i.e. content) (the content may be streamed to the mobile phone) so that the mobile phone can play the content for the user; (2) receiving the content at the mobile phone; (3) playing the content for the user; (4) storing the content in a storage unit of the mobile phone as the content is received; (5) optionally protecting the stored content using a digital rights management (DRM) scheme; (6) enabling the user of the mobile phone to indicate that the user desires to acquire ring content corresponding to the content while the mobile phone is playing the content; (7) after the user indicates his/her desire to acquire the ring content, optionally transmitting a message to a remote system, wherein the message identifies the content the mobile phone and/or the user; (8) receiving, at the mobile phone and from the remote system, a response to the message, wherein the response may indicate whether the user is authorized to acquire the ring content; (9) if the response indicates that the user may not acquire the ring content, then deleting the stored portion of the content from the storage unit; (10) enabling the user to specify a portion of the stored content; (11) if necessary or desired, converting the specified portion of the stored content to an appropriate or specified format (e.g., monophonic or polyphonic ring tone or MP3 audio format, MP4 video format, or other format); (12) storing the specified portion of the stored content in a ring content file and, if necessary, moving the ring content file to a ring content storage area; and (13) if the user does not indicate that he/she desired to acquire ring content corresponding to the received content while the received content is playing or within a set time after the received content finishes playing or if the user is offered to purchase the ring content but declines the offer, then deleting the content from the storage unit.

A method for acquiring ring content for a mobile phone according to a fourth embodiment of the invention includes: (1) receiving, at the mobile phone, transmitted program data and non-program data, wherein the non-program data comprises ring content corresponding to the program data and/or a link to a product information page corresponding to the ring content, through which page a user of the phone can acquire the ring content; (2) playing, at the mobile phone, the received program data so that a user of the phone can consume the program data; (3) storing the received non-program data in a storage unit of the mobile phone; while playing the received program data: (4a) informing the user of the phone, through an output device of the phone, that ring content corresponding to the program data is available to be acquired; (4b) enabling the user to indicate that the user would like to acquire the ring content; and (4c) waiting for an indication from the user that indicates the user would like to acquire the ring content.

In some embodiments, the non-program data stored in the storage unit comprises the ring content, and the method further comprises configuring the phone or ring content so that the stored ring content can not be played by the phone. In some embodiments, the method further comprises transmitting, from the phone, a message to a remote system after the indication is received; receiving, at the phone, a reply message transmitted in response to the message transmitted to the remote system; and, if the reply message indicates that the ring content may be acquired, configuring the phone or the stored ring content so that the phone can play the stored ring content.

In another aspect, the invention provides a mobile phone. In some embodiments, the mobile phone comprises a processor and a computer readable medium storing instructions, the instructions comprising: instructions for receiving transmitted content; instructions for playing the received content for a user of the mobile phone; instructions for enabling the user of to indicate that the user desires to acquire ring content corresponding to the content while the phone is playing the content; instructions for transmitting, from the mobile phone, a message to a remote system after the user indicates a desire to acquire the ring content, wherein the remote system receives the message and, after receiving the message, selects a ring tone or ring view based, at least in part, on information included in message and transmits the selected ring content to the mobile phone; instructions for receiving the ring content at the mobile phone; and instructions for storing the received ring content in a storage unit of the mobile phone.

BRIEF DESCRIPTION OF THE DRAWINGS

The accompanying drawings, which are incorporated herein and form part of the specification, help illustrate various embodiments of the present invention. In the drawings, like reference numbers indicate identical or functionally similar elements.

DETAILED DESCRIPTION OF PREFERRED EMBODIMENTS

The present invention provides systems and method for acquiring content (e.g., ring tones, ring views or other time-based media). To illustrate various features of the invention and how to make and use the invention, some preferred embodiments are described below. The embodiments described below are embodiments in which a user uses a mobile phone to acquire ring content for the mobile phone.

Figure 1:
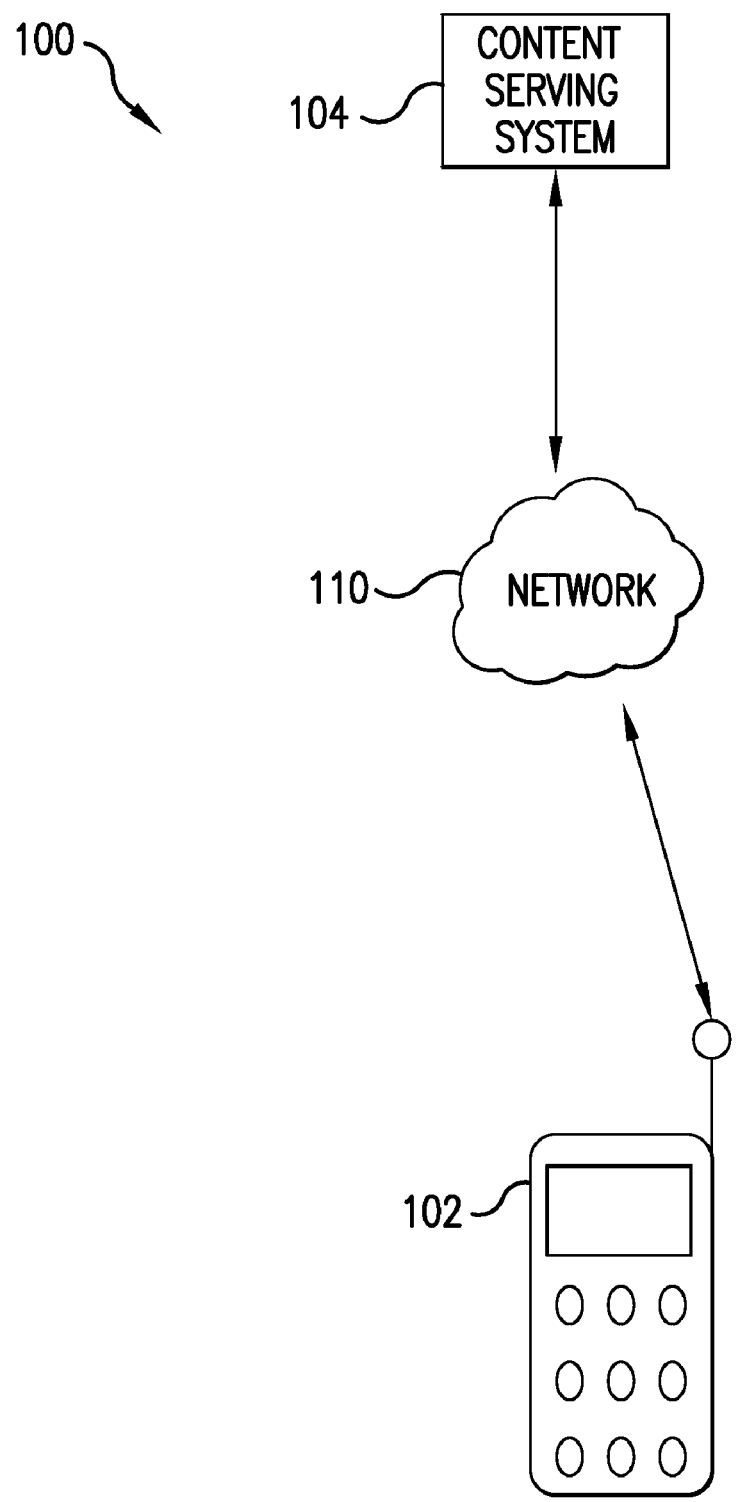
FIG. 1 is a schematic of a system according to an embodiment of the invention.

Referring now to FIG. 1, FIG. 1 is a schematic of a system 100 according to an embodiment of the invention. System 100 illustrates a mobile phone 102 in communication with a content serving system 104 through a network system 110. Content serving system 104 may include one or more content servers, which may or may not be co-located. Similarly, network system 110 may include one or more networks (e.g., a mobile telephone network and a land-line network).

Figure 2A:
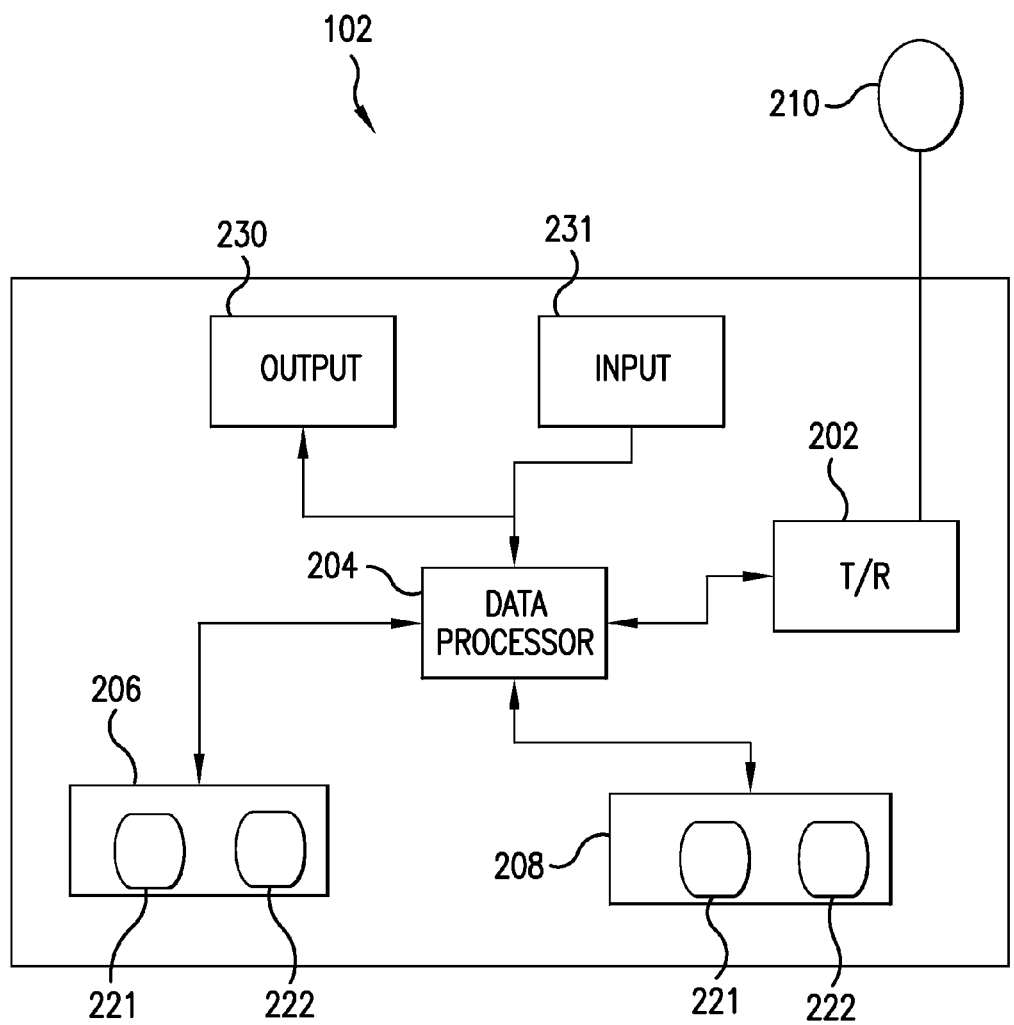
FIGS. 2A and 2B are schematics of a mobile phone according to some embodiments of the invention.

Referring now to FIG. 2a, FIG. 2a is a schematic of mobile phone 102 according to some embodiments. As illustrated in FIG. 2a, in some embodiments, mobile phone 102 may include a transceiver 202, coupled to an antenna 201, for transmitting and receiving data; a data processor 204, coupled to the transceiver 202, for processing data received by the transceiver 202; a volatile storage unit 206 (e.g., random access memory (RAM)), coupled to the data processor 204, for storing data 221 and program instructions 222 executable by the data processor 204, which program instructions 222 when executed by the data processor 204 cause the data processor to achieve certain results; a non-volatile storage unit 208, coupled to the data processor 204, for storing data (e.g., ring content and other data) and program instructions 222); a visual output device 230 (e.g., a display screen or other output device); and an input device 231, which may include buttons.

Figure 2B:
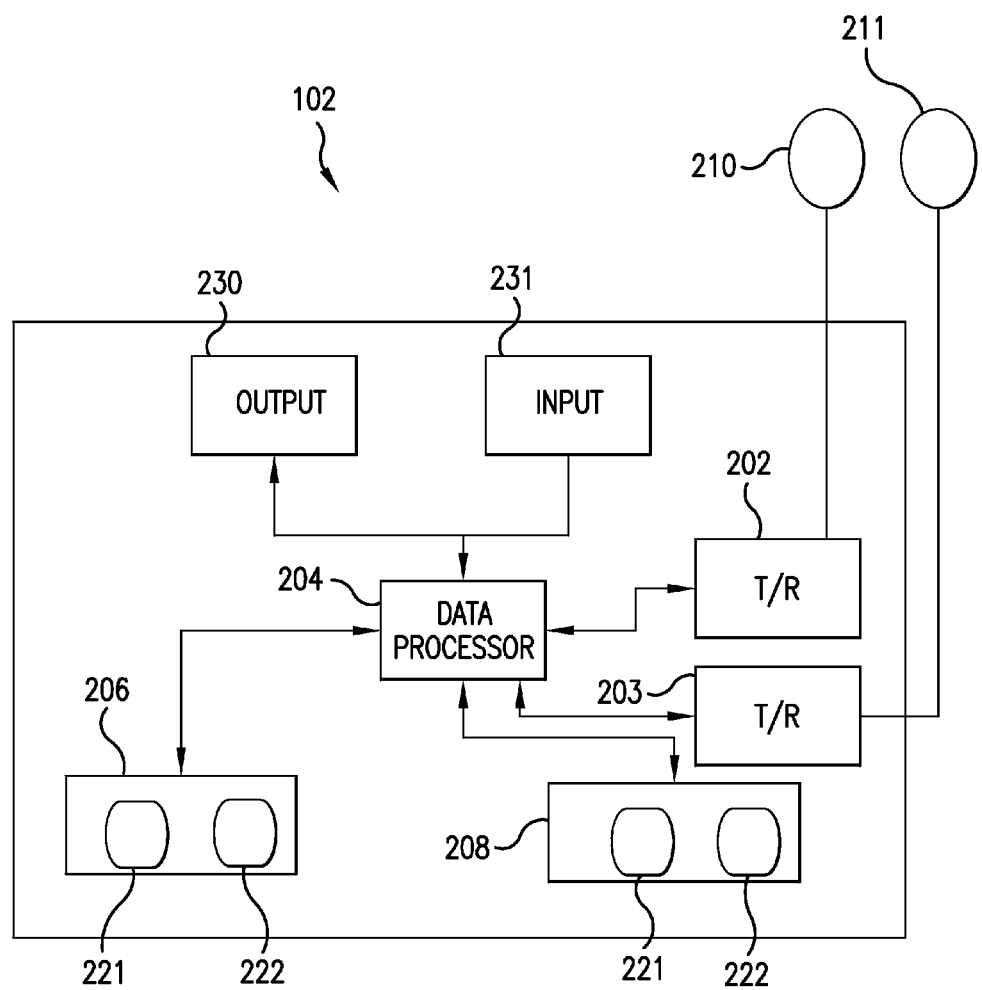

Referring now to FIG. 2b, FIG. 2b is a schematic of mobile phone 102 according to some embodiments. As illustrated in FIG. 2b, in some embodiments, mobile phone 102 may include a secondary receiver 203, coupled to a secondary antenna 211 (i.e. a secondary receive system). When a secondary receive system exists, content may be received by such a system and transceiver 202 and antenna 210 may be used in parallel to facilitate transfer of ring content, or to complete elements of the transaction process. In this case, data processor 204 may act as a bridge between both systems.

Figure 3:
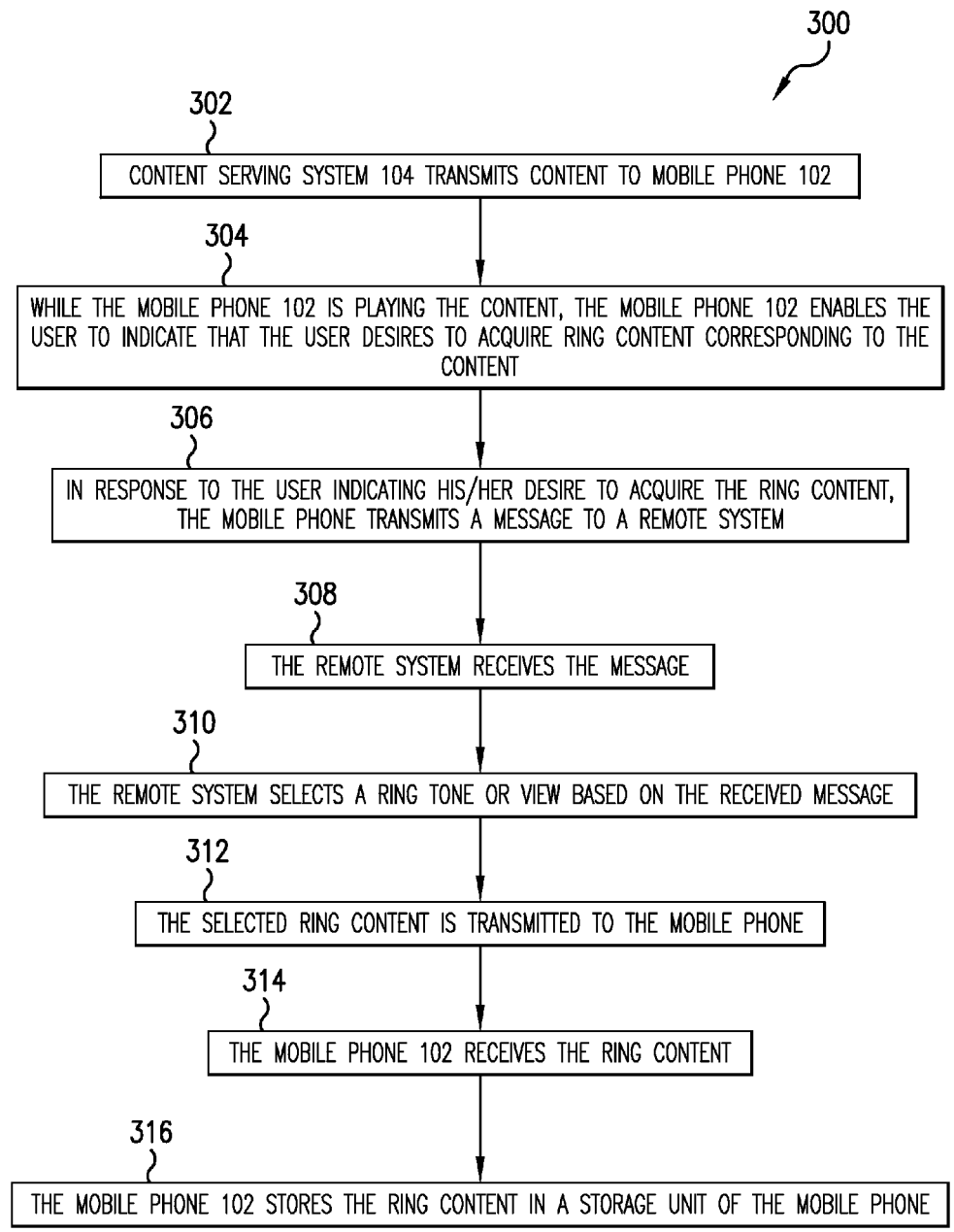
FIGS. 3-9 are flow charts illustrating processes according to various embodiments.

Referring now to FIG. 3, FIG. 3 is a flow chart illustrating a process 300, according to an embodiment, for acquiring ring content using mobile phone 102. Process 300 may begin in step 302, where content serving system 104 transmits (e.g., streams or otherwise transmits) to mobile phone 102 content (e.g., music, a music video, or other time-based media) so that the mobile phone can play the content so that the user can listen to and/or watch the content. In addition to transmitting the content, system 104 may also transmit an identifier that identifies (e.g., is associated with) the content and an identifier identifying a remote system (e.g., the identifier may be a link or a uniform resource identifier or locator). In some embodiments, system 104 may transmit these identifiers immediately prior to, at the same time as, or some time after transmitting the content.

In step 304, while the mobile phone 102 is playing the content, the mobile phone 102 enables the user to indicate that the user desires to acquire ring content corresponding to the content. For example, program instructions 222 may cause data processor 204 to display information on output device 230 that prompts the user to activate a particular button on the mobile phone or select a menu option displayed on a user interface of the mobile phone or activate a soft button, etc.

In step 306, in response to the user indicating his/her desire to acquire the ring content, the mobile phone transmits a message to a remote system (e.g., the remote system identified by the system identifier transmitted to mobile phone 102). The message may include an identifier associated with the content. The message may be sent immediately after the user indicates his/her desire to acquire the ring content or it may be sent at a later time (e.g., when the phone 102 finishes playing the content or in response to a predetermined event). The message may also contain an identifier identifying the mobile phone, the ring content capabilities of the mobile phone, and/or an identifier identifying a type of ring content (e.g., monophonic, polyphonic, or video)). In step 308, the message is received at the remote system.

In step 310, the remote system selects a ring tone or view based on the received message. For example, if the message includes information indicating that the user desires a ring tone and that the mobile phone is capable of playing "master" ring tones, then the server may select a master ring tone corresponding to the content identifier included in the message. Similarly, if the message includes information indicating that the user wants a ring tone and that the mobile phone is not capable of playing master ring tones, but can play polyphonic ring tones, then the server may select an appropriate polyphonic ring tone, if applicable. Likewise, for example, if the message includes information indicating that the user desires to have a polyphonic ring tone, then the server may select a polyphonic ring tone corresponding to the content, regardless of whether the mobile phone is capable of playing master ring tones.

In some embodiments, the received message may include information identifying the make and model of the mobile phone 102, and the remote system may include a mechanism for determining the ring content capabilities of the identified mobile phone make and model (e.g., the remote system may maintain a database of various mobile phone makes and models and their corresponding ring tone capabilities). In such an embodiment, the remote system may first determine the mobile phone's ring content capabilities, and then, based, at least in part, on the result of the determination, select the appropriate format of ring content.

In step 312, the remote system transmits to the mobile phone the selected ring content. In step 314, the mobile phone 102 receives the ring content, and, in step 316, stores the ring content in a storage unit of the mobile phone (e.g., storage unit 208).

Although not illustrated in FIG. 3, prior to step 312, in some embodiments, the remote system determines whether the user is authorized to acquire the ring content. In these embodiments, the remote system performs step 312 only if it determines the user is authorized.

Also, although not illustrated in FIG. 3, prior to or after step 312, in some embodiments, the remote system may charge an amount of money (e.g., $1.99) to a user account prior to or after transmitting the ring content. In these embodiments, the user may be given the option to confirm his/her desire to acquire the ring content prior the remote system charging the user's account. For example, in some embodiments where the user is charged some amount of money for each ring content downloaded to phone 102, after step 312, the user may be given the ability to preview the ring content so that the user can decide whether he/she wants to purchase the ring content. If after previewing the ring content the user decides to proceed with the purchase, phone 102 may transmit an acknowledgement message to the remote system, which, in response to receiving the acknowledgement message, charges an appropriate amount to an account associated with the user and/or phone.

Figure 4:
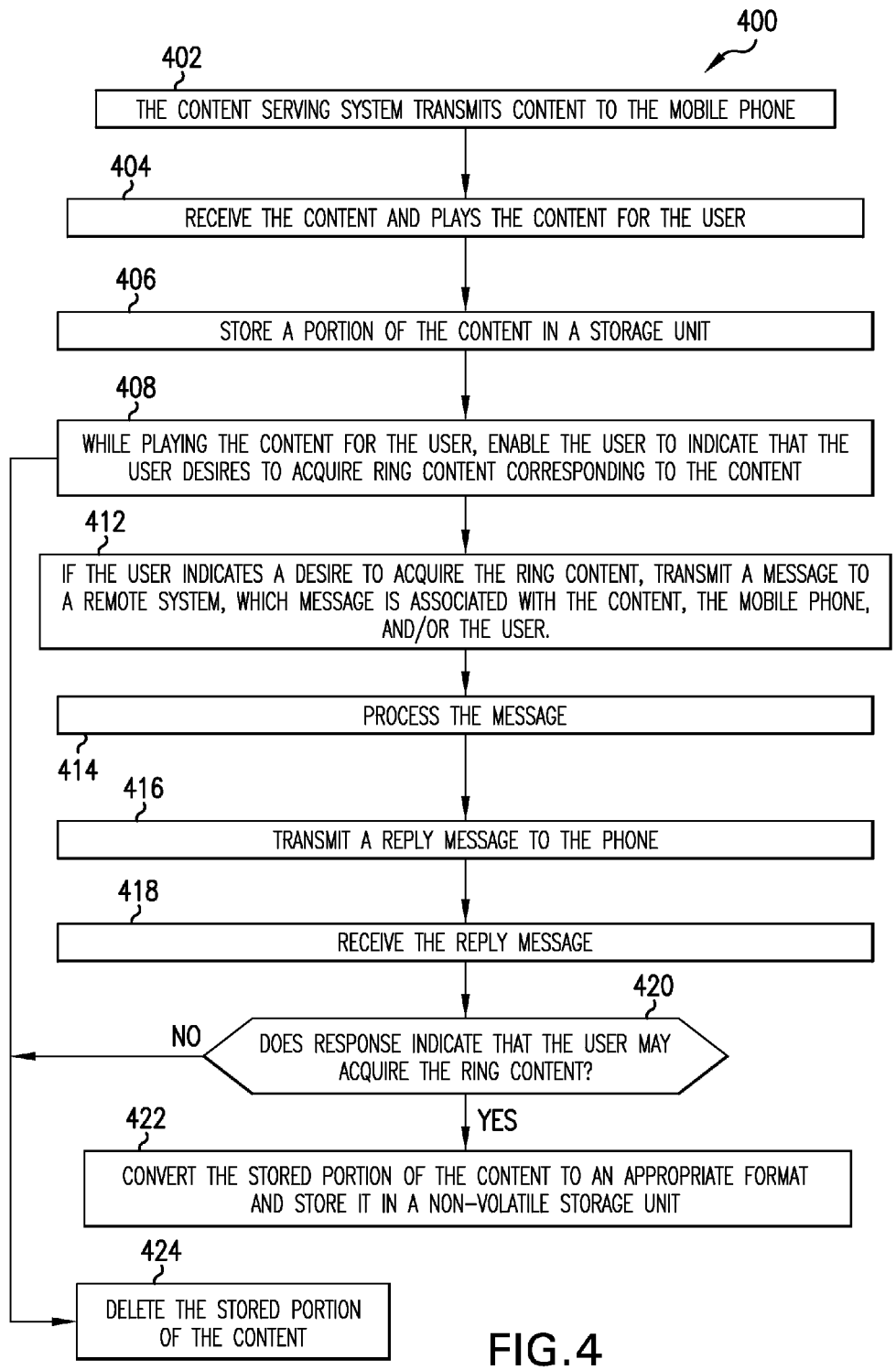

Referring now to FIG. 4, FIG. 4 is a flow chart illustrating a process 400, according to an embodiment, for acquiring ring content using mobile phone 102. Process 400 may begin in step 402, where content serving system 104 transmits content (i.e., music or music video) to the mobile phone (the content may be streamed to the mobile phone) so that the mobile phone can play the content for the user. In step 404, the mobile phone receives the content and plays the content for the user.

In step 406, the mobile phone 102 stores a predetermined portion of the content in a storage unit of the mobile phone (e.g., storage unit 206). For example, the predetermined portion may consist of the first 30 seconds or more of the content or some other portion of the content. The portion stored in the storage unit may be copy and/or use protected using a digital rights management (DRM) scheme.

In step 408, while the mobile phone 102 is playing the content, the mobile phone 102 enables the user to indicate that the user desires to acquire ring content corresponding to the content. While the phone 102 is playing the content or within a set time after the phone 102 finishes playing the content, if the user indicates a desire to acquire the ring content, then process 400 proceeds to step 412, otherwise it proceeds to step 424. If the user indicates a desire to acquire the ring content, process 400 may proceed to step 412 immediately or may wait an amount of time (e.g., the phone 102 may wait until it finishes playing the content before proceeding to step 412).

In step 412, the phone 102 transmits a message to a remote system (e.g., content serving system or other remote system), wherein the message identifies (e.g., is associated with) the content, the mobile phone, and/or the user. In step 414, the remote system processes the message. For example, the remote system may access a database to determine whether the user or phone 102 is authorized to acquire the ring content. Alternatively or additionally, the remote system may use information in the message to charge an amount of money (e.g., $1.99) to an account associated with the user and/or phone 102. In step 416, after processing the message, the remote system transmits a reply message to the phone 102.

In step 418, the phone 102 receives the reply message, wherein the reply message may indicate whether the ring content may be acquired by the user. In step 420, the phone 102 determines whether the response from the remote system indicates that the user may acquire the ring content. If the reply message indicates that the user may not acquire the ring content, the process 400 proceeds to step 424, otherwise it proceeds to step 422.

In step 422, the phone 102 may convert the stored portion of the content to an appropriate format, if necessary, (e.g., monophonic or polyphonic ring tone or MP3 audio format, MP4 video format, or other format) and store it in a non-volatile storage (e.g., storage unit 208). In some embodiments, step 422 may be performed prior to step 412 to enable the user to preview the ring content before committing to acquiring the ring content. If the user decides not to acquire the ring content after previewing the ring content, then process 500 may not proceed to step 412.

In step 424, the phone 102 may delete the stored portion of the content. Accordingly, if the user does not indicate that he/she desires to acquire ring content corresponding to the received content while the received content is playing or within a set time after the received content finishes playing, or if the user is offered to purchase the ring content (e.g., while phone 102 is playing the content) and declines the offer, then the stored portion of the content may be deleted automatically.

Figure 5:
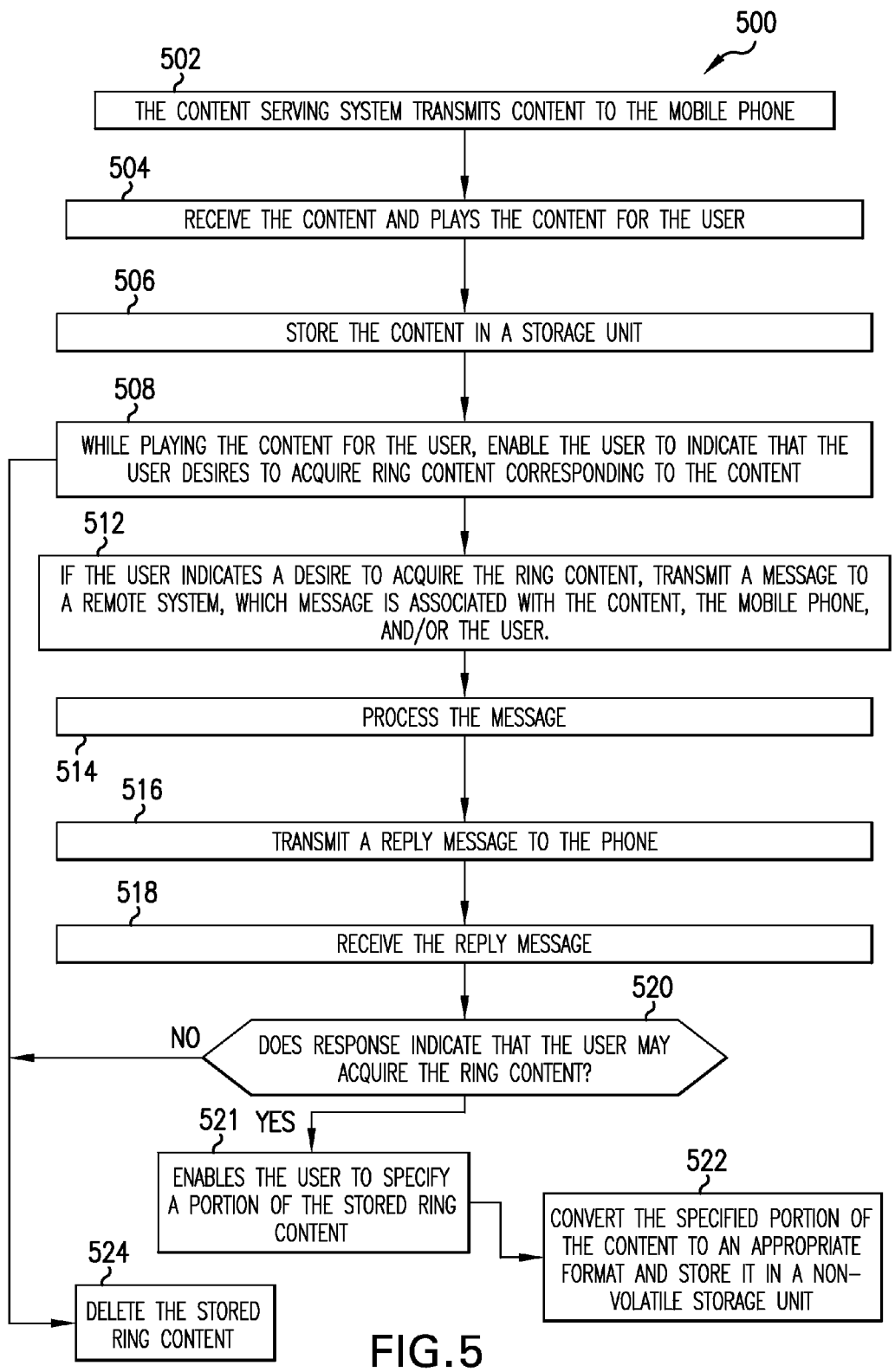

Referring now to FIG. 5, FIG. 5 is a flow chart illustrating a process 500, according to an embodiment, for acquiring ring content using mobile phone 102. Process 500 may begin in step 502, where content serving system 104 transmits content to the mobile phone (the content may be streamed to the mobile phone) so that the mobile phone can play the content for the user. In step 504, the mobile phone receives the content and plays the content for the user.

In step 506, the mobile phone 102 stores the received content in a storage unit of the mobile phone. The content stored in the storage unit may be a copy and/or use protected using a digital rights management (DRM) scheme.

In step 508, while the mobile phone 102 is playing the content, the mobile phone 102 enables the user to indicate that the user desires to acquire ring content corresponding to the content. While the phone 102 is playing the content or within a set time after the phone 102 finishes playing the content, if the user indicates a desire to acquire the ring content, then process 500 proceeds to step 512, otherwise it proceeds to step 524. If the user indicates a desire to acquire the ring content, process 500 may proceed to step 512 immediately or may wait an amount of time (e.g., the phone 102 may wait until it finishes playing the content before proceeding to step 512).

In step 512, the phone 102 transmits a message to a remote system (e.g., content serving system or other remote system), wherein the message identifies (e.g., is associated with) the content the mobile phone and/or the user. In step 514, the remote system processes the message. In step 516, after processing the message, the remote system transmits a reply message to the phone 102.

In step 518, the phone 102 receives the reply message. The reply message may indicate whether the ring content may be acquired by the user. In step 520, the phone 102 determines whether the response from the remote system indicates that the user may acquire the ring content. If the reply message indicates that the user may not acquire the ring content, the process 500 proceeds to step 524, otherwise it proceeds to step 521.

In step 521, the phone 102 enables the user to specify a portion of the stored ring content (e.g., the first 30 seconds or more of the content). In step 522, after the user specifies a portion of the stored ring content, the phone 102 may convert the specified portion to an appropriate format, if necessary, (e.g., monophonic or polyphonic ring tone or MP3 audio format, MP4 video format, or other format) and store it in a file stored in a ring content storage area. In some embodiments, step 522 may be performed prior to step 512 to enable the user to preview the ring content before committing to acquiring the ring content. If the user decides not to acquire the ring content after previewing the ring content, then process 500 may not proceed to step 512. In step 524, the phone 102 may delete the stored portion of the content.

Figure 6:
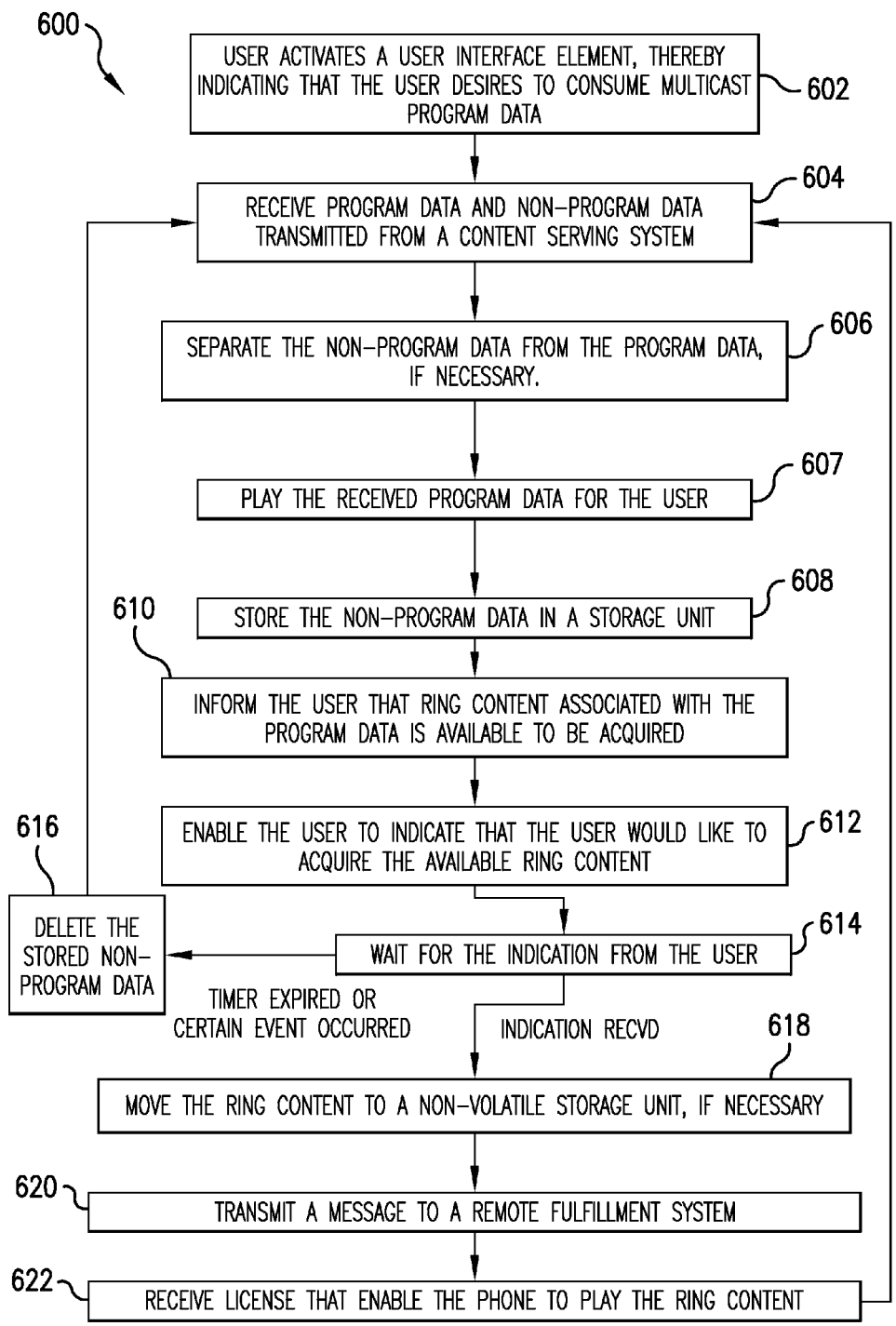

Referring now to FIG. 6, FIG. 6 is a flow chart illustrating a process 600, according to an embodiment, for acquiring ring content using mobile phone 102. Process 600 may begin in step 602, where the user of the phone 102 activates a user interface element (e.g., button, menu option, etc.), which activation is an indication that the user desires to consume multicast program data (e.g., listen to and/or watch content that is multicast from content serving system 104).

In step 604, after the user activates the user interface element, data processor 204, under the control of program instructions 222, uses transceiver 202 to receive program data multicast from a content serving system. In some embodiments, the content serving system multicasts non-program data together with the program data. Accordingly, in step 604, the data processor 204 receives not only the multicast program data but also the accompanying non-program data, which may include ring content or other content (e.g., digital images or other content) associated with the program data.

In step 606, data processor 204 may, if necessary, separate the non-program data from the program data. For example, this step may be necessary if the non-program data is interleaved with the program data. In step 607, data processor 204 plays the received program data for the user to consume. While the program data is being played, steps 608-618 may be performed.

In step 608, data processor 204 stores the non-program data in a storage unit (e.g., unit 206). In some embodiments where the non-program data includes ring content, the stored ring content or the phone may be configured such that the stored ring content is not playable. For example, the ring content may be encrypted or the phone may activate a setting that prohibits the phone from playing the ring content. This protects the ring content from unauthorized use.

In step 610, data processor 204 provides an indication to the user that non-program data exists and that it may be acquired by the user. In step 612, processor 204 enables the user to indicate to processor 204 a desire to acquire the non-program data. For example, processor 204 may be configured such that the user's activation of a certain user interface element is treated as an indication by processor 204 that the user desires to acquire the non-program data. In some embodiments, prior to step 612, the user is given the option to preview the non-program data.

In step 614, processor 204 waits for the user to indicate that the user desires to acquire the non-program data. If after a certain amount of time transpires or a specific event occurs and the user has not indicated to processor 204 a desire to acquire the non-program data, then process 600 may proceed to step 616, otherwise it may proceed to step 618.

In step 616, processor 204 may delete the non-program data stored in the storage unit (e.g., free the space occupied by the non-program data or erase the non-program data from the storage unit).

In step 618, after the user has indicated to processor 204 a desire to acquire the non-program data, then processor 204 may move the non-program data (or a portion thereof—e.g., the ring content included in the non-program data) to a non-volatile storage unit, if necessary.

Next (step 620) processor 204 may use transceiver 202 to transmit a message to a remote system so that an account associated with the user and/or the phone 102 can be charged an appropriate amount. Thus, the message may identify the user and/or the phone as well as the non-program data. Next (step 622), processor may receive a reply message from the remote system, which reply message may include information that enables the phone to play the ring content. For example, the reply message may include a license, which license enables phone 102 to decrypt and play the ring content.

Figure 7:
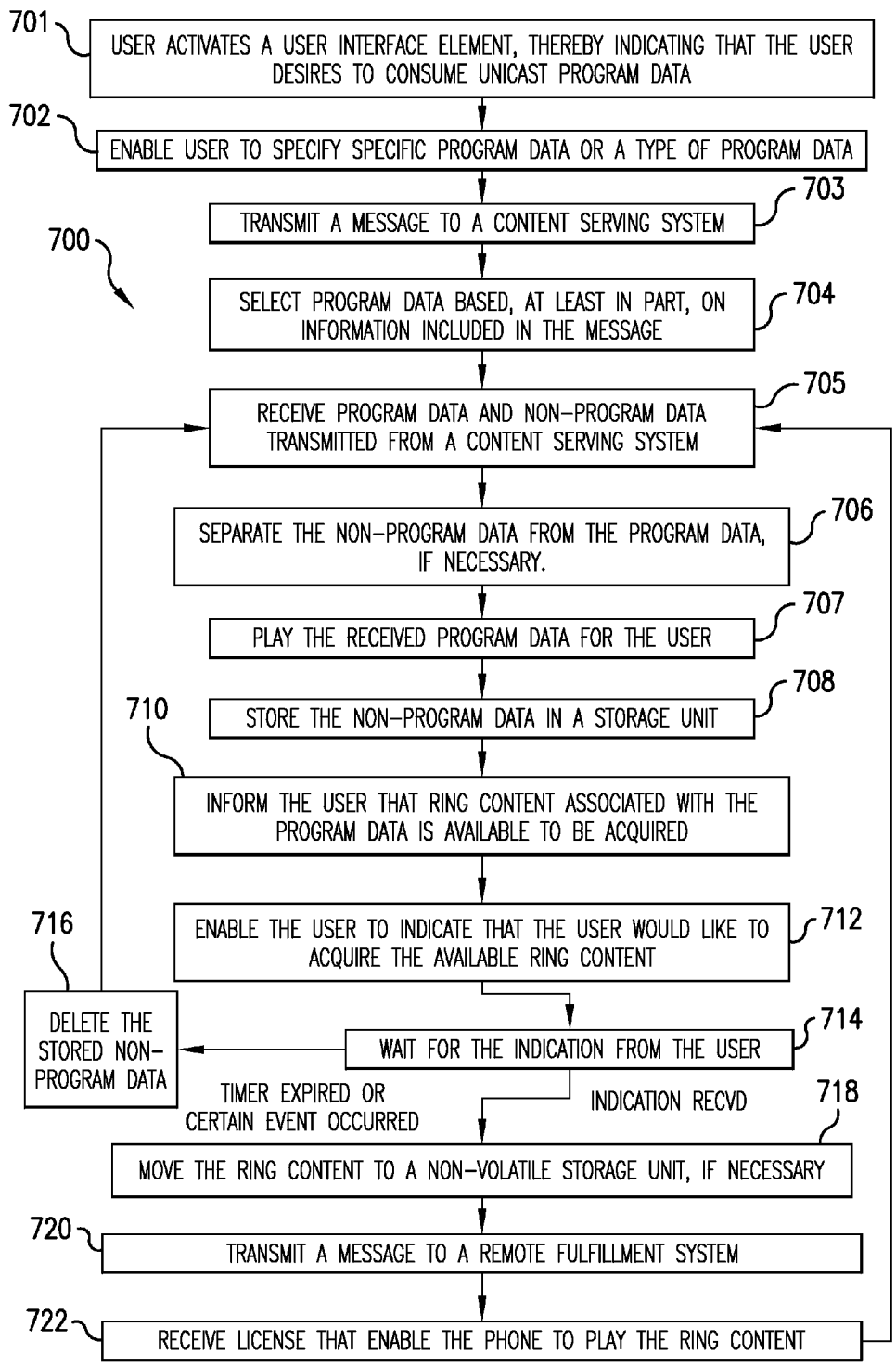

Referring now to FIG. 7, FIG. 7 is a flow chart illustrating a process 700, according to an embodiment, for acquiring ring content using mobile phone 102. Process 700 may begin in step 701, where the user of the phone 102 activates a user interface element (e.g., button, menu option, etc.), which activation is an indication that the user desires to consume unicast program data.

In step 702, after the user activates the user interface element, data processor 204 may enable the user to specify the program data or type of program data the user would like to consume. For example, with respect to music or music videos, processor 204 may display a user interface that enables the user to select a particular song or video, a particular artist, a particle genre of music, a particular profile that may identify one or more genres and/or artists, etc.

In step 703, processor 204, under the control of program instructions 222, uses transceiver 202 to transmit a message to a content serving system. The message preferably includes information that enables the content serving system to select program data desired by the user. For example, the message may include an identifier identifying a song or music video, an artist, a genre, a profile, etc. If the message identifies a profile, then the content serving system may retrieve the profile, which may identify songs, artists and/or genres, and select program data that matches the profile.

In step 704, the content serving system selects program data based, at least in part, on information included in the message and transmits the selected program data to phone 102.

In step 705, processor 204 receives the program data transmitted from the content serving system. In some embodiments, the content serving system transmits non-program data together with the program data. Accordingly, in step 705, the data processor 204 receives not only the transmitted program data but also the accompanying non-program data, which may include ring content associated with the program data.

In step 706, data processor 204 may, if necessary, separate the non-program data from the program data. For example, this step may be necessary if the non-program data is interleaved with the program data. In step 707, data processor 204 plays the received program data for the user to consume. While the program data is being played, steps 708-718 may be performed.

In step 708, data processor 204 stores the non-program data in a storage unit (e.g., unit 206). In step 710, data processor 204 provides an indication to the user that non-program data exists and that it may be acquired by the user. In step 712, processor 204 enables the user to indicate to processor 204 a desire to acquire the non-program data. In some embodiments, prior to step 712, the user is given the option to preview the non-program data.

In step 714, processor 204 waits for the user to indicate that the user desires to acquire the non-program data. If after a certain amount of time transpires or a specific event occurs and the user has not indicated to processor 204 a desire to acquire the non-program data, then process 700 may proceed to step 716, otherwise it may proceed to step 718.

In step 716, processor 204 may delete the non-program data stored in the storage unit. In step 718, after the user has indicated to processor 204 a desire to acquire the non-program data, then processor 204 may move the non-program data (or a portion thereof—e.g., the ring content included in the non-program data) to a non-volatile storage unit, if necessary. Next (step 720) processor 204 may use transceiver 202 to transmit a message to a remote system so that an account associated with the user and/or the phone 102 can be charged an appropriate amount. Thus, the message may identify the user and/or the phone as well as the non-program data. Next (step 722), processor may receive a license from the remote system, which license enables phone 102 to play the ring content.

Figure 8:
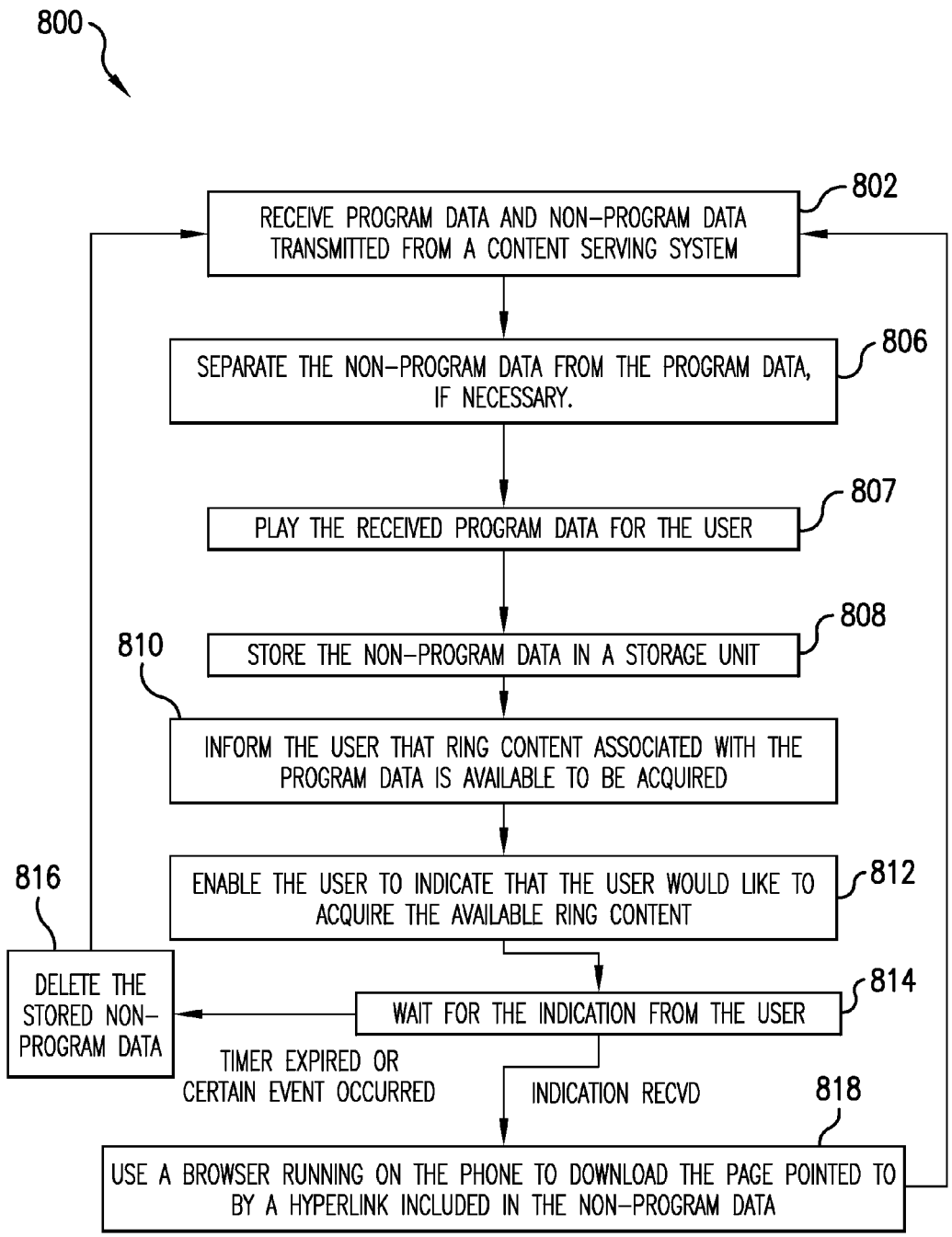

Referring now to FIG. 8, FIG. 8 is a flow chart illustrating a process 800, according to an embodiment, for acquiring ring content using mobile phone 102. Process 800 may begin in step 802, where phone 102 uses transceiver 202 to receive program data transmitted (unicast or multicast) from a content serving system. In some embodiments, the content serving system transmits non-program data together with the program data. Accordingly, in step 802, the data processor 204 receives not only the program data but also the accompanying non-program data, which, in this embodiment, includes a link to a product information page (e.g., web page) corresponding to ring content associated with the program data. The user can interact with the page to acquire the ring content. For example, the page may allow the user to put the ring content in an electronic shopping basket and then purchase the ring content.

In step 806, data processor 204 may, if necessary, separate the non-program data from the program data. In step 807, data processor 204 plays the received program data for the user to consume. While the program data is being played, steps 808-822 may be performed.

In step 808, data processor 204 stores the non-program data in a storage unit (e.g., unit 206). In step 810, data processor 204 provides an indication to the user that ring content corresponding to the program data may be acquired by the user. In step 812, processor 204 enables the user to indicate to processor 204 a desire to acquire the ring content.

In step 814, processor 204 waits for the user to indicate that the user desires to acquire the ring content. If after a certain amount of time transpires or a specific event occurs and the user has not indicated to processor 204 a desire to acquire the ring content, then process 800 may proceed to step 816, otherwise it may proceed to step 818. In step 816, processor 204 may delete the non-program data stored in the storage unit.

In step 818, after the user has indicated to processor 204 a desire to acquire the ring content, processor 204 may launch a browser (if one is not already running) and cause the browser to download the page pointed to by the hyperlink included in the non-program data. At this point, the user may interact with the page to acquire the ring content. For example, the user may use the page to instruct a remote system to transmit the ring content to phone 102, which upon receiving the ring content may store the ring content in a non-volatile storage unit. In this manner, the user can use phone 102 to acquire the ring content.

Figure 9:
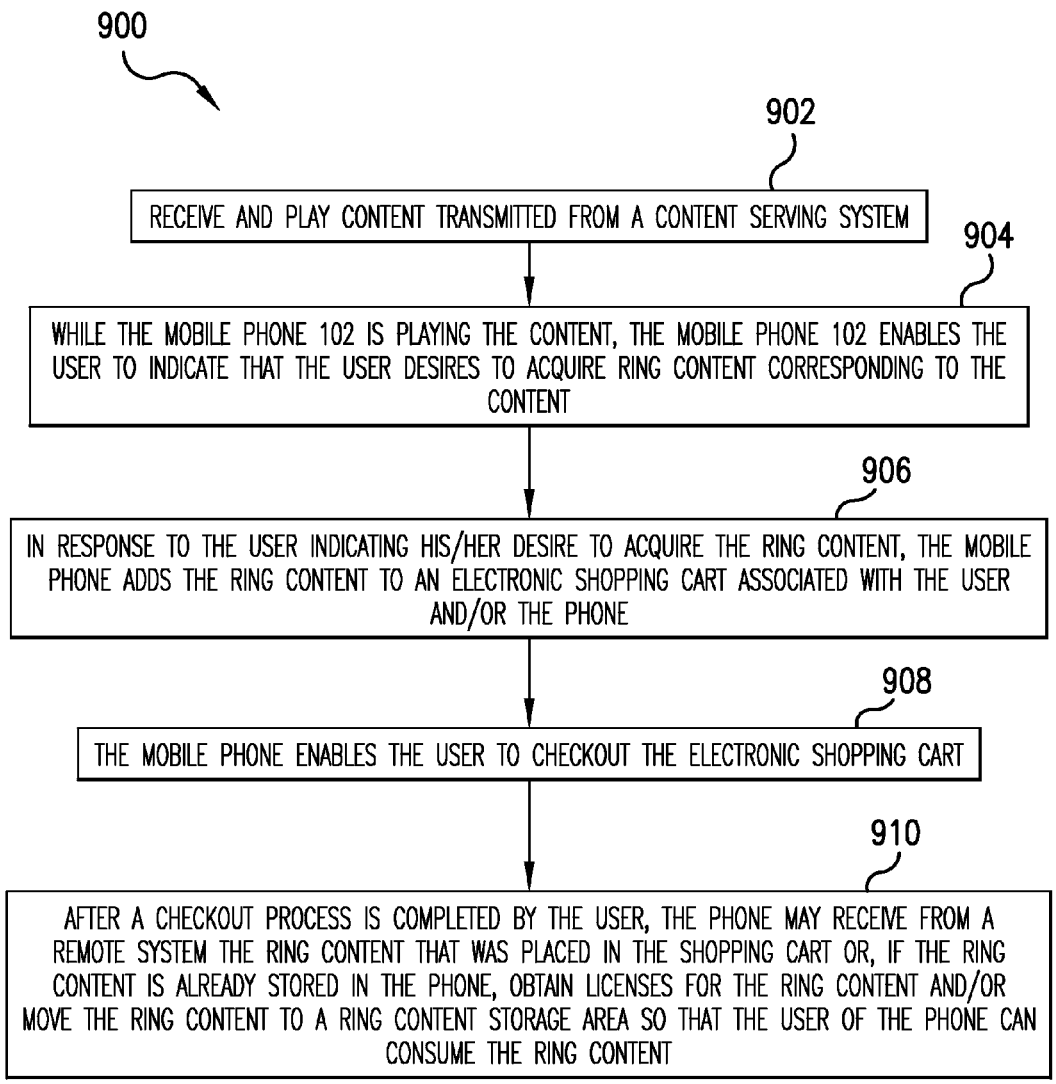

Referring now to FIG. 9, FIG. 9 is a flow chart illustrating a process 900, according to an embodiment, for acquiring ring content using mobile phone 102. Process 900 may begin in step 902, where phone 102 uses transceiver 202 to receive content transmitted from a content serving system. In step 904, while the mobile phone 102 is playing the content, the mobile phone 102 enables the user to indicate that the user desires to acquire ring content corresponding to the content. In step 906, in response to the user indicating his/her desire to acquire the ring content, the mobile phone adds the ring content to an electronic shopping cart associated with the user and/or the phone. In step 908, the mobile phone enables the user to checkout the electronic shopping cart. This step may occur while the phone is playing the content or any time after the phone finishes playing the content. Process 900 proceeds to step 910 when the user checkouts the shopping cart. In step 910, after a checkout process is completed by the user, the phone may receive from a remote system the ring content that was placed in the shopping cart or, if the ring content is already stored in the phone, obtain licenses for the ring content and/or move the ring content to a ring content storage area so that the user of the phone can consume the ring content.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed simultaneously. As one example, although FIG. 6 shows step 618 occurring before step 622, step 618 may occur after step 622.

What is claimed is:

1. A method for acquiring content for a communication device, comprising:
    receiving, at the communication device, transmitted content;
    receiving at the communication device information identifying the content and information identifying a remote system, wherein the information identifying the content and the information identifying the remote system are transmitted with the content;
    playing the received content for a user of the communication device;
    while the communication device is playing the content, enabling the user of the communication device to indicate that the user desires to acquire related content related to the transmitted content, but different than the transmitted content;
    after the user indicates a desire to acquire the related content, transmitting, from the communication device, a message to the identified remote system, wherein the remote system receives the message and, after receiving the message, selects related content based, at least in part, on information included in the message and transmits the selected related content to the communication device;
    receiving the related content at the communication device; and
    in response to receiving the related content, storing the received related content in the communication device.

2. The method of claim 1, wherein the message comprises an identifier identifying the transmitted content.

3. The method of claim 1, wherein the message comprises information identifying capabilities of the communication device and/or an identifier identifying a type of content.

4. The method of claim 1, wherein the transmitted content comprises digital music.

5. The method of claim 1, wherein the transmitted content is streamed to the communication device, 6. The method of claim 1, wherein the transmitted content is multicast to a plurality of communication devices such that each of the plurality of communication devices is operable to receive and play the transmitted content.

7. The method of claim 1, wherein the transmitted content is unicast to the communication device.

8. The method of claim 1, wherein the message transmitted to the remote system includes the information identifying the content.

9. The method of claim 8, wherein the step of transmitting the message to a remote system comprises transmitting the message to the identified remote system.

10. The method of claim 1, wherein
    the communication device is a mobile phone, and
    the transmitted content is not a ring tone preview or a ring tone.

11. The method of claim 1, wherein the step of transmitting the message to the remote system comprises transmitting the message immediately in response to the user indicating the desire to acquire the related content.

12. The method of claim 1, wherein the step of transmitting the message to the remote system comprises transmitting the message when the communication device is finished playing the content.

13. The method of claim 1, wherein the step of transmitting the message to the remote system comprises transmitting the message at a future point in time after the communication device is finished playing the content.

14. A method for acquiring content for a communication device, comprising:
    receiving, at the communication device and via a network, information comprising content and a pointer to a page;
    playing the received content for a user of the communication device;
    while the communication device is playing the content, enabling the user to indicate that the user desires to acquire related content corresponding to the content; and
    if the user indicates a desire to acquire the related content, then, after receiving the indication, automatically downloading to the communication device the page pointed to by the pointer and displaying the page to the user, wherein the page is configured so that the user can use the page to obtain the related content.

15. The method of claim 14, wherein the content is received at the communication device without the user having to previously request the content.

16. The method of claim 14, wherein the content is not a ring tone preview or a ring tone.

17. A method for acquiring content for a communication device, comprising:
    receiving, at the communication device and via a network, a transmitted stream comprising program data and non-program data;
    in response to receiving the stream, (1) playing, at the communication device, the received program data so that a user of the communication device can consume the program data and (2) storing the received non-program data in a storage unit of the communication device;

while playing the received program data: (a) informing the user of the communication device, through an output device of the communication device, that related content corresponding to the program data is available to be acquired; (b) enabling the user to indicate that the user would like to acquire the related content; and (c) waiting for an indication from the user that indicates the user would like to acquire the related content, wherein the nonprogram data comprises the related content and/or a link to a product information page for the related content 18. The method of claim 17, wherein the non-program data comprises the related content and the method further comprises moving the related content from the storage unit to a second storage unit after the indication is received.

19. The method of claim 18, wherein the first storage unit is volatile storage unit and the second storage unit is a non-volatile storage unit.

20. The method of claim 19, further comprising transmitting, from the communication device, a message to a remote system after the indication is received, 21. The method of claim 20, further comprising receiving, at the communication device, a reply message transmitted in response to the message transmitted to the remote system.

22. The method of claim 21, wherein the step of receiving the reply message occurs prior to the step of moving the related content.

23. The method of claim 21, wherein the reply message comprises a license that enables the communication device to play the related content.

24. The method of claim 17, wherein the non-program data stored in the storage unit comprises the related content, and the method further comprises configuring the communication device or related content so that the stored related content can not be played by the communication device.

25. The method of claim 24, further comprising: transmitting, from the communication device, a message to a remote system after the indication is received; receiving, at the communication device, a reply message transmitted in response to the message transmitted to the remote system; and, if the reply message indicates that the related content may be acquired, configuring the communication device or the stored related content so that the communication device can play the stored related content.

26. The method of claim 17, wherein the non-program data stored in the storage unit comprises the related content, which is protected by a digital rights management (DRM) scheme, and the method further comprises receiving a license after the indication is received, which license enables the communication device to play the DRM protected related content.

27. The method of claim 26, further comprising: transmitting, from the communication device, a message to a remote system after the indication is received; receiving, at the communication device, a reply message transmitted in response to the message transmitted to the remote system, wherein the reply message includes the license.

28. The method of claim 17, wherein the non-program data comprises the link and the method further comprises using a browser executing in the communication device to download the product information page to the communication device.

29. The method of claim 17, further comprising separating the non-program data from the program data prior to storing the non-program data in the storage unit.

30. The method of claim 29, wherein the non-program data and the program data are interleaved when received at the communication device.

31. The method of claim 17, wherein prior to receiving the program data the method comprises;
receiving an indication that the user desires to consume unicast program data;
enabling the user to specify a type of program data or a profile;
receiving information identifying a type of program data or a profile;
transmitting a message, from the communication device, to a remote system, wherein the message includes the received information and the remote system uses the information to select program data, and wherein the remote system transmits the selected program data to the communication device.

32. The method of claim. 31, wherein the remote system transmits the non-program data with the selected program data.

33. The method of claim 17, further comprising deleting the non-program data from the storage unit if the indication is not received within a predetermined amount of time or prior to the occurrence of a predetermined event.

* * * * *